United States Patent
Gioco

(10) Patent No.: US 11,248,742 B2
(45) Date of Patent: Feb. 15, 2022

(54) DEVICE AND METHOD OF ATTACHING SCREEN PROTECTORS TO MOBILE DEVICES, TABLETS, AND COMPUTERS

(71) Applicant: Filippo Gioco, Munich (DE)

(72) Inventor: Filippo Gioco, Munich (DE)

( * ) Notice: Subject to any disclaimer, the term of this patent is extended or adjusted under 35 U.S.C. 154(b) by 64 days.

(21) Appl. No.: 16/894,451

(22) Filed: Jun. 5, 2020

(65) Prior Publication Data
US 2021/0317948 A1   Oct. 14, 2021

Related U.S. Application Data

(60) Provisional application No. 62/858,774, filed on Jun. 7, 2019.

(51) Int. Cl.
*A47G 1/17*   (2006.01)
*F16M 13/02*   (2006.01)
*F16B 1/00*   (2006.01)

(52) U.S. Cl.
CPC ... *F16M 13/022* (2013.01); *F16B 2001/0035* (2013.01)

(58) Field of Classification Search
CPC .. F16M 13/022; F16B 2001/0035; A47G 1/17
USPC .................. 248/201, 467, 683, 206.5, 309.4
See application file for complete search history.

(56) References Cited

U.S. PATENT DOCUMENTS

| | | | |
|---|---|---|---|
| 7,508,657 B1 | 3/2009 | Smith | |
| 8,143,983 B1 | 3/2012 | Lauder et al. | |
| 8,662,298 B2 * | 3/2014 | Aldana | A45C 11/00 206/320 |
| 8,665,044 B2 | 3/2014 | Lauder et al. | |
| 9,112,956 B2 | 8/2015 | Huang et al. | |
| 9,287,916 B2 * | 3/2016 | Wicks | H04B 1/3888 |
| 9,743,729 B2 | 8/2017 | Yeo et al. | |
| 9,801,297 B2 * | 10/2017 | Amin | C03C 3/093 |
| 2013/0042581 A1 | 2/2013 | Holben et al. | |

(Continued)

FOREIGN PATENT DOCUMENTS

| | | |
|---|---|---|
| CN | 201557345 | 8/2010 |
| WO | 2012045563 | 4/2012 |

OTHER PUBLICATIONS

"MacBook Pro 15 inch Privacy Screen Protector Filter" found at https://www.amazon.com/.

(Continued)

*Primary Examiner* — Todd M Epps
(74) *Attorney, Agent, or Firm* — John Rizvi; John Rizvi, P.A.- The Patent Professor®

(57) ABSTRACT

A screen protector attachment device for releasably attaching any of a variety of screen protectors to a viewing display of an electronic device. A screen protector attachment device includes a base bracket having a magnet embedded therein, and a screen foil bracket having a magnet embedded therein wherein the base bracket comprises one of a planar bracket, an angled bracket, a curved bracket, a corner bracket, or a flexible bracket, configured to accommodate electronic devices having either a full viewing display or a display with a peripheral frame. A protector screen is affixed to one or more screen foil brackets that are each magnetically coupled to corresponding base brackets attached about the viewable display of electronic devices.

20 Claims, 9 Drawing Sheets

(56) References Cited

U.S. PATENT DOCUMENTS

| | | | |
|---|---|---|---|
| 2013/0279096 A1* | 10/2013 | Gengler | G06F 1/1669 |
| | | | 361/679.01 |
| 2013/0293072 A1 | 11/2013 | Sturniolo | |
| 2017/0105118 A1 | 4/2017 | Lee | |
| 2017/0144404 A1 | 5/2017 | Dai et al. | |
| 2018/0129829 A1 | 5/2018 | Li | |
| 2018/0185970 A1* | 7/2018 | Simmons | F24F 13/084 |
| 2020/0241181 A1* | 7/2020 | Lee | G02B 1/11 |

OTHER PUBLICATIONS

"Smart Magnetic Cover for Apple iPad 2" found at https://www.amazon.com.

"Easy On/Off Magnetic Privacy Screen Filter MacBook" found at https://www.amazon.com.

* cited by examiner

DEVICE AND METHOD OF ATTACHING SCREEN PROTECTORS TO MOBILE DEVICES, TABLETS, AND COMPUTERS

CROSS-REFERENCE TO RELATED APPLICATIONS

This application claims the benefit of United States Provisional Patent Application Ser. No. 62/858,774, filed on Jun. 7, 2019, which is incorporated by reference herein in its entirety.

FIELD OF THE INVENTION

The present invention relates generally to screen protectors, and more particularly, to a device and method for releasably attaching a variety of different screen protectors to the viewing display of electronic devices including mobile phones, tablets, and computers.

BACKGROUND OF THE INVENTION

Advancements in computer and communication technologies has resulted in a number of companies manufacturing and offering a host of electronic devices including mobile phones, tablets, and computers to consumers. Once deemed a luxury, such devices are now part of the everyday living, and often deemed a necessity to communicate with each other, conduct business, engage in social media, and for work. Various aspects of engineering have helped to reduce the size and weight of components resulting in the ability to produce electronic devices that are faster, able to store and process larger amounts of data, and are smaller in physical size. Manufacturers have also incorporated a host of features to increase sales and attract consumers. For example, many mobile phones generally include high tech cameras, bio-authentication, gesture recognition, voice control, and GPS navigation to assist users in locating places. Further, some companies have specialized in providing a variety of accessories to better accommodate individuals when using such electronic devices. As new generations of such devices hit the market, so does the increase in accessories to provide a pleasurable experience when using such devices.

Many electronic devices are portable and transported from place to place. Immediate accessibility to such devices has become a prevailing feature desired by many users. Being able to view and reply to emails, look over calendar events, engage in social media, or simply make calls to friends or family, has become an expected benefit of daily life when using portable electronic devices. Portability has given the consumer the advantage of staying connected with family, friends and world news at any moment in time. In today's environment it is common to see individuals using mobile phones, tablets, or notebook computers in malls, stores, airports, cars, doctor's office, at work or outdoors. Using portable electronic devices also comes with certain risks, discomforts, or exposure to potential damage to the device itself. The use of portable electronic devices can sometimes compromise the security of information being displayed as a result of preying eyes. For example, during use, mobile phones or tablets are often held a short distance away from user's eyes allowing individuals, in close proximity, to view the contents shown on the device's display. Also, using electronic devices outdoors can cause abrasion, wear, and scratches on the surface of the screen, and can also make it difficult to see information displayed on the device's screen as a result of a bright lit room or sunlight.

As such, screen protectors have become a desired accessory used to compliment portable electronic devices. There are a number of screen protectors available on the market today to address the potential risk of exposure to damage, sunlight, and privacy when using a portable electronic device. Screen protectors are generally made from a thin layer of plastic or foil material including various properties. Examples of screen protectors include, transparent film protectors designed to protect against scratches and abrasion to the screen, anti-glare protectors to block out sunlight and UV when using the device outdoors, privacy screen protectors designed to darken the screen when the screen is viewed at an angle from others, and mirror screen protectors to use the device as a mirror. Screen protectors generally come in a variety of different sizes, shapes and colors. There remains the daunting task of applying a screen protector to the screen of an electronic portable device. Individuals often apply screen protectors to electronic devices with unsatisfactory results often requiring them to repeat the application process over and over again while wasting multiple screen protectors in the process. Needless to say, the challenge often results in artifacts being lodged between the screen of the device and the applied screen protector, such as air bubbles, lint, dust, dirt, or hair follicles. One downfall is that once a screen protector is installed, it is permanent. If users wish to use a different type of screen protector, then the painstaking installation task must be repeated.

Conventional tools and methods have been employed to assist users in properly applying screen protectors to portable electronic devices. Some methods require a clean environment, and the use of various materials such as tape, a dry cloth, a rigid card to help compress the screen protector on the screen, and alcohol pads to clean the screen beforehand. The coordinated effort of manipulating the portable device while negotiating the application tools, to attach the screen protector, not only taxes the owner's patience but is very cumbersome, time consuming, and costly as a result of wasting multiple screens. Efforts have been made to help relieve the burden and to provide attachable screen protectors that require less effort to install, and allow users the ability to interchange screen protectors with ease. Such screen protectors typically include a screen protector that includes a rigid, surrounding frame or cover that is removably attached to the outer frame of the electronic device by fasteners, hooks, or friction. The fasteners are permanently attached to the surface of the electronic device while others methods of attachment include the use of an adhesive material.

Such conventional devices and methods provide limited use and have various drawbacks. In one example, screen protectors are often applied using an adhesive or fastening system that either leaves a sticky residue on the surface of the device, or remains permanently mounted to the device. Also some screen protectors include a foil that is attached to a surrounding frame or outer casing to allow a user to interchange one screen protector with another. Such protectors however, must correspond to the size and configuration of the electronic device that it is being mounted on. Thus, a number of screen protectors having different sized frames are need to accommodate electronic devices having different shapes and sizes. Further, many devices used to attach a screen protector to an electronic device often obstruct the ability of a user to adequately view the display screen of the electronic device. Many screen protector devices are not adapted for use with electronic devices having a full visual screen where the visual part of the screen extends up to edge of the device. This is an important aspect because industry is moving towards the trend of providing electronic devices with full visual screens. Also, prior art devices used to install screen protectors are only applicable to portable electronic devices, interfere with operative features of the electronic device such as, the closing mechanisms of notebook computers, are not applicable for use with a variety of different screen protectors, or result in a screen protector that is permanently attached to the display screen of the electronic device.

Accordingly, there is an established need for a device and method of releasably attaching a variety of different screen protectors to a viewing display of an electronic device including either a framed screen or a full visual screen, without interfering with operative features of the electronic device, and providing an unobstructed view of the viewing display when such screen protectors are installed.

SUMMARY OF THE INVENTION

The present invention is directed to a device and method of applying a variety of different screen protectors to the viewing display of electronic communication devices. The device comprises a base bracket having a magnet embedded therein where the base bracket comprises a planar, curved, double-curved, or angled configuration, and a screen foil bracket having a magnet embedded therein. A plurality of devices are attached to a screen protector such that portions of the screen protector are permanently attached to each screen foil bracket, and each screen foil bracket is releasably attached to a corresponding base bracket that secured to the viewing display of an electronic device.

A first embodiment of the invention provides a screen protector attachment device for attaching a screen protector to a viewing display of an electronic device wherein the screen protector attachment device includes a base bracket having a planar surface and a recess formed within the planar surface to retain a base magnet, and a screen foil bracket having a planar surface and a recess formed therein to retain a foil magnet in which a portion of a screen protector is permanently attachable to the screen foil bracket thereon, and wherein the base bracket abuts the screen foil bracket when the base bracket is proximate the screen foil bracket.

In a second aspect, each magnet is embedded within each recess, and the width of the screen foil bracket is smaller than the width of the base bracket.

In another aspect, the base bracket includes an angled bracket having a planar bottom member including a recess for retaining a magnet therein, and a side member that is attached to the planar bottom member in a perpendicular configuration.

In still another aspect, a screen protector attachment device comprises at least one curved bracket having a curved body including a recess formed at one end of the body for retaining a magnet therein, and a screen foil bracket having a magnet embedded therein.

In another aspect, the at least one curved bracket includes a second curved bracket having a curved body including a recess formed at one end of the body for retaining a magnet therein, wherein the at least one curved bracket and the second bracket are coupled together, at a right angle via a bridge, and a screen foil bracket having a magnet embedded therein.

In yet another aspect, there is provided a screen protector attachment device comprising a flexible base bracket including a series of panels that are each bendable along a plurality of fold lines or movable hinges, wherein one panel includes a recess for retaining a magnet therein, and a screen foil bracket having a magnet embedded within the screen foil bracket.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left". "rear". "right". "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Various terms used in the following detailed description are provided and included for giving a perspective understanding of the function, operation, and use of the present invention, and such terms are not intended to limit the embodiments, scope, claims, or use of the present invention.

The term, "screen protector", as used herein, means or refers to any and all types of plastic or foil screen protectors, including but not limited to, scratch resistant protectors generally used to protect display screens on electronic devices against damage including scratches, abrasions, and wear, anti-glare screen protectors for shielding users from ultraviolet light, and glare; anti-privacy screen protectors to restrict viewing information; and mirror foils.

The term, "electronic device", as used herein, means or refers to any and all portable and non-portable electronic device that includes a display screen for viewing information, data, or contents, and includes, but is not limited to, mobile or smart phones. PDAs, notebook computers, desktop computers, pagers, tablets, wired or wireless phones, monitors, game consoles, or televisions.

Shown throughout the figures, the present invention is directed to a device and a method of attaching any of a variety of different screen protectors to a viewing display of an electronic device having a limited or full visual display.

Figure 1:
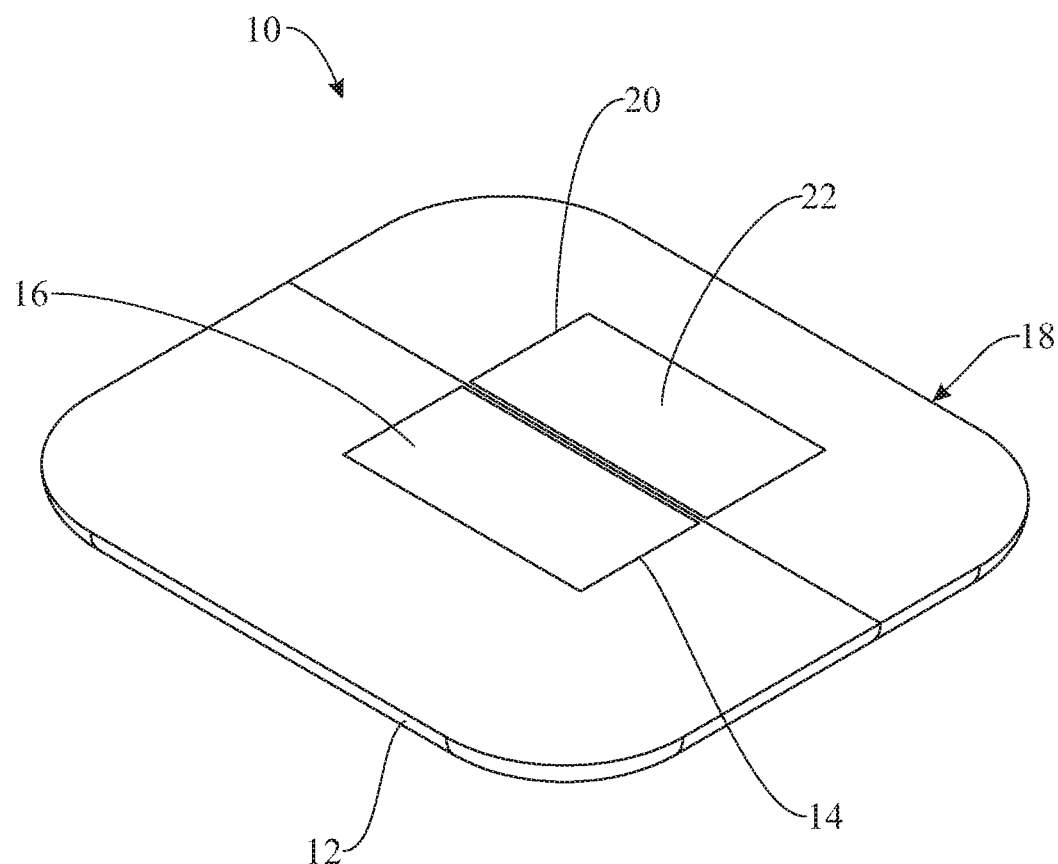
FIG. 1 is an isometric view of a screen protector attachment device for attaching a screen protector to a display screen of an electronic device, in accordance with one embodiment of the present invention.
Figure 2:
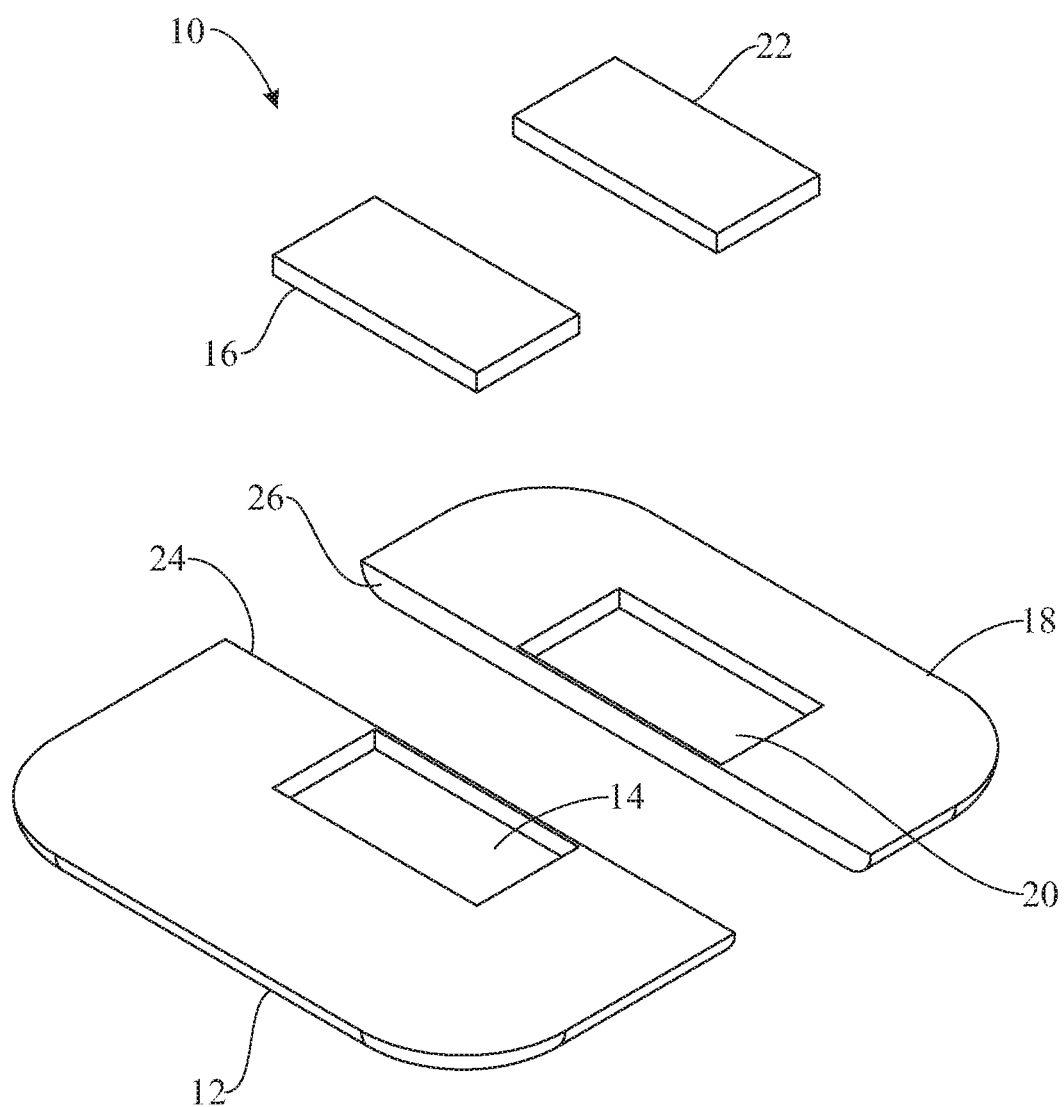
FIG. 2 is an exploded isometric view of the screen protector attachment device of FIG. 1, showing a base bracket, a screen foil bracket, and magnets retained in each bracket, in accordance with the one embodiment of the present invention.

Referring now to FIGS. 1 and 2, wherein like elements are represented by like numerals throughout, there is shown a top perspective view, and an exploded view, respectively, of a screen protector attachment device 10, in accordance with one embodiment of the present invention. The screen protector attachment device 10 includes a base bracket 12 having a bass recess 14 for retaining a base magnet 16, and a screen foil bracket 18 having a foil recess 20 for also retaining a foil magnet 22. In one embodiment, each bracket 12, 18 comprises a half-square geometric shape having a top planar surface, and rounded corners. However, other geometrical shapes and configurations are contemplated. Each recess 14, 20 is formed within the body of each respective bracket 12, 18, and positioned in a generally central region, along one side of the bracket 12, 18 such that a sidewall of each recess 14, 20 forms an outer lateral or peripheral edge 24, 26 of each bracket 12, 18, respectively. In one embodiment, each recess 14, 20 comprises a rectangular shape but may comprise a number of different geometric shapes including, but not limited to, round, square, triangular, or oval, as examples. The brackets 12, 18 may be constructed from any of a resin, plastic, ceramic, hard rubber, polymer, or other such rigid or semi-rigid material of construction. In one embodiment, brackets 12, 18 of a screen protector attachment device 10 in accordance with the present invention comprises a length of about 10 millimeters ("mm") to about 20 mm. In one further embodiment, brackets 12, 18 of a screen protector attachment device 10 in accordance with the present invention comprises a width of about 5 mm to about 15 mm. In one further embodiment, recesses 14, 20 of a screen protector attachment device 10 in accordance with the present invention comprises a length of about 4 mm to about 8 mm, and a depth of about 0.2 mm to about 1.0 mm. Exemplary dimensions of one embodiment of a screen protector attachment device 10 include a base bracket 12 comprising approximately 15 mm in length and 8 mm in width. Exemplary dimensions of one further embodiment of a screen protector attachment device 10 further include a base recess 14 being approximately 6 mm in length and 0.5 mm in depth. In a further exemplary embodiment, a screen foil bracket 18 comprises a dimensional configuration that is approximately, 15 mm in length, 5.5 mm in width, and a foil recess 20 that is 6 mm in length and 0.5 mm in depth. Thus, as shown, the width of the screen foil bracket 18 is slightly smaller in width than that of the base bracket 12 to provide unobstructed viewing of the display screen of an electronic device 30 when using the device 10 to attach a screen protector to the display screen.

Magnets 16, 22 may comprise any of a number of magnetic materials of construction including, but in no manner limited to, neodymium iron boron (NdFeB, NIB), samarium cobalt (SmCO). Alnico, ceramic, or ferrite magnets, just to name a few. Each magnet 16, 22 is shaped and sized to fit within each a corresponding recess 14, 20, respectively. In at least one embodiment, the top surface of each magnet 16, 22 is coplanar with the top planar surface of each respective bracket 12, 18 when the magnets 16, 22 are disposed within the corresponding recesses 14, 20. Thus, when magnets 16, 22 are secured within corresponding recesses 14, 20 of brackets 12, 18, respectively, the top planar surface of each magnet 16, 22 is coplanar with the planar top surface of the base bracket 12 and the screen foil bracket 18, respectively, as best illustrated in FIG. 1. In achieving this configuration, the thickness of each magnet 16, 22 should correlate with the dimensional depth of each recess 14, 20. The magnets 16, 22 are attached or retained within each recess 14, 20, using any of a variety of attachment mechanism including, but not limited to, adhesive, glue, fasteners, friction fit, etc., just to name a few. In at least one further embodiment, the magnets 16, 22 may be partially or completely embedded or encased within each bracket 12, 18 in which the structural body of the brackets provides a protective barrier for the magnets 16, 22.

With continued reference made to FIGS. 1 and 2, an operational characteristic of the present screen protector attachment device 10 is governed by the principle attraction of magnets 16, 22 that are securely retained within each respective recess 14, 20 of each bracket 12, 18, respectively. When base bracket 12 is in close proximity to the screen foil bracket 18, the two brackets 12, 18 are drawn and retained together by the magnetic attraction of the magnets 16, 22, thereby forcing the lateral edges 24, 26 of each bracket 12, 18, respectively, to abut against one other. In doing so, brackets 12, 18 come together to form a generally square shape having rounded corners, at least partially defining the screen protector apparatus 10, such as is shown in the illustrative embodiment of FIG. 1.

Figure 3:
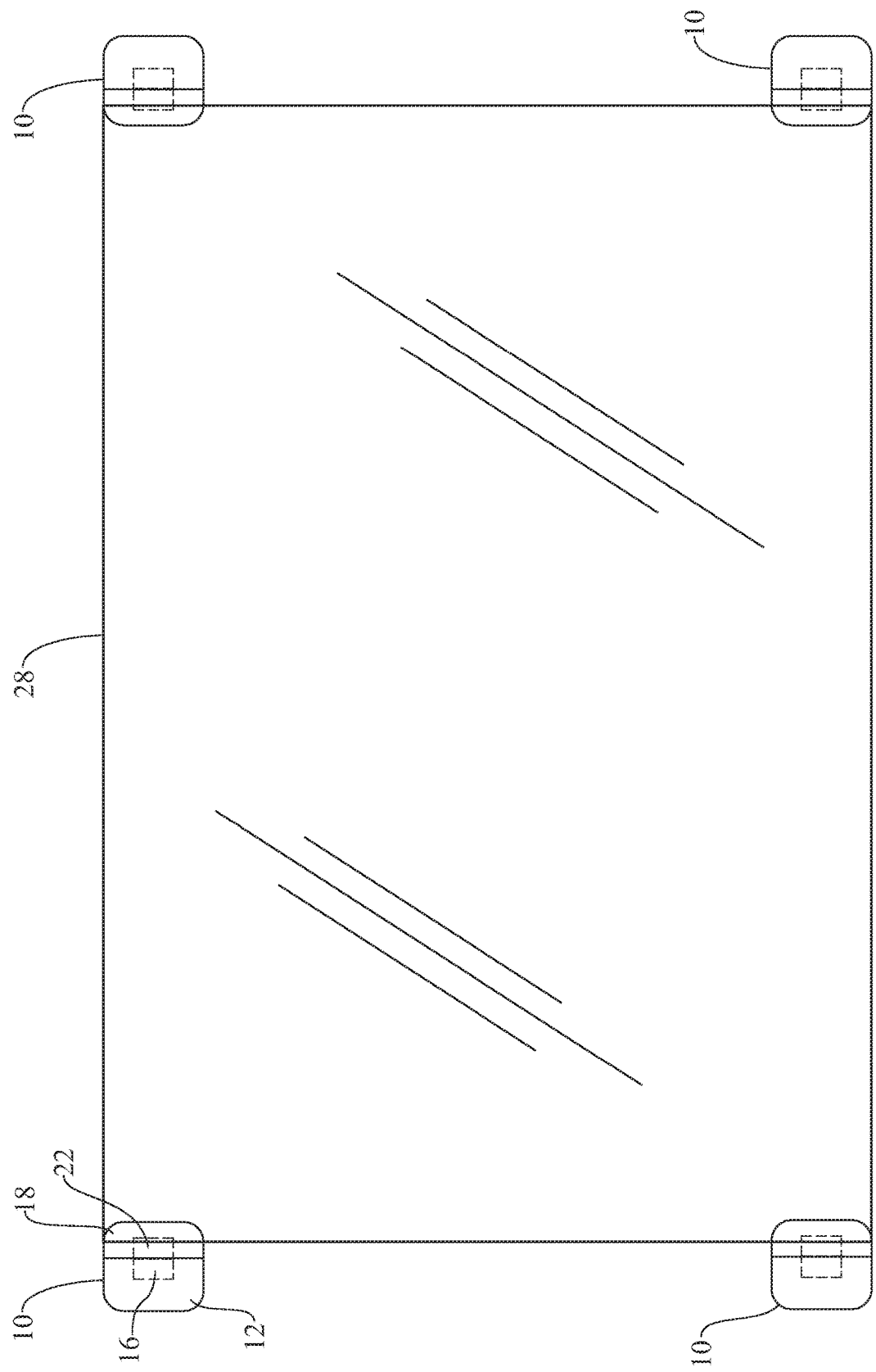
FIG. 3 is a front view of a screen protector for an electronic device, showing a plurality of screen protector attachment devices of FIG. 1, attached along the corners of the screen protector, in accordance with an embodiment of the present invention.

Turning to FIG. 3 there is shown a front view of a screen protector 28 including a plurality of screen protector attachment devices 10 attached along the longitudinal corner edges of the screen protector 28 to readily attach the screen protector 28 to the viewing display 32 of an electronic device 30, in accordance with an embodiment of the present invention. A plurality of screen protector attachment devices 10 are each permanently attached to the screen protector 28 by using well-known adhesives, glue, fasteners, or other permanently attaching devices or methods, such that a longitudinal edge of each corner of the screen protector 28 is aligned to each lateral edge 26 of each screen foil bracket 18. As shown, a base bracket 12 is releasably joined to a corresponding screen foil bracket 18, via magnetic force, for readily attaching the screen protector 28 to an electronic device. Base brackets 12 are coupled to each corresponding one of the screen foil brackets 18 in preparation of attaching the screen protector 28 to a viewing display 32 of an electronic device 30.

Figure 4:
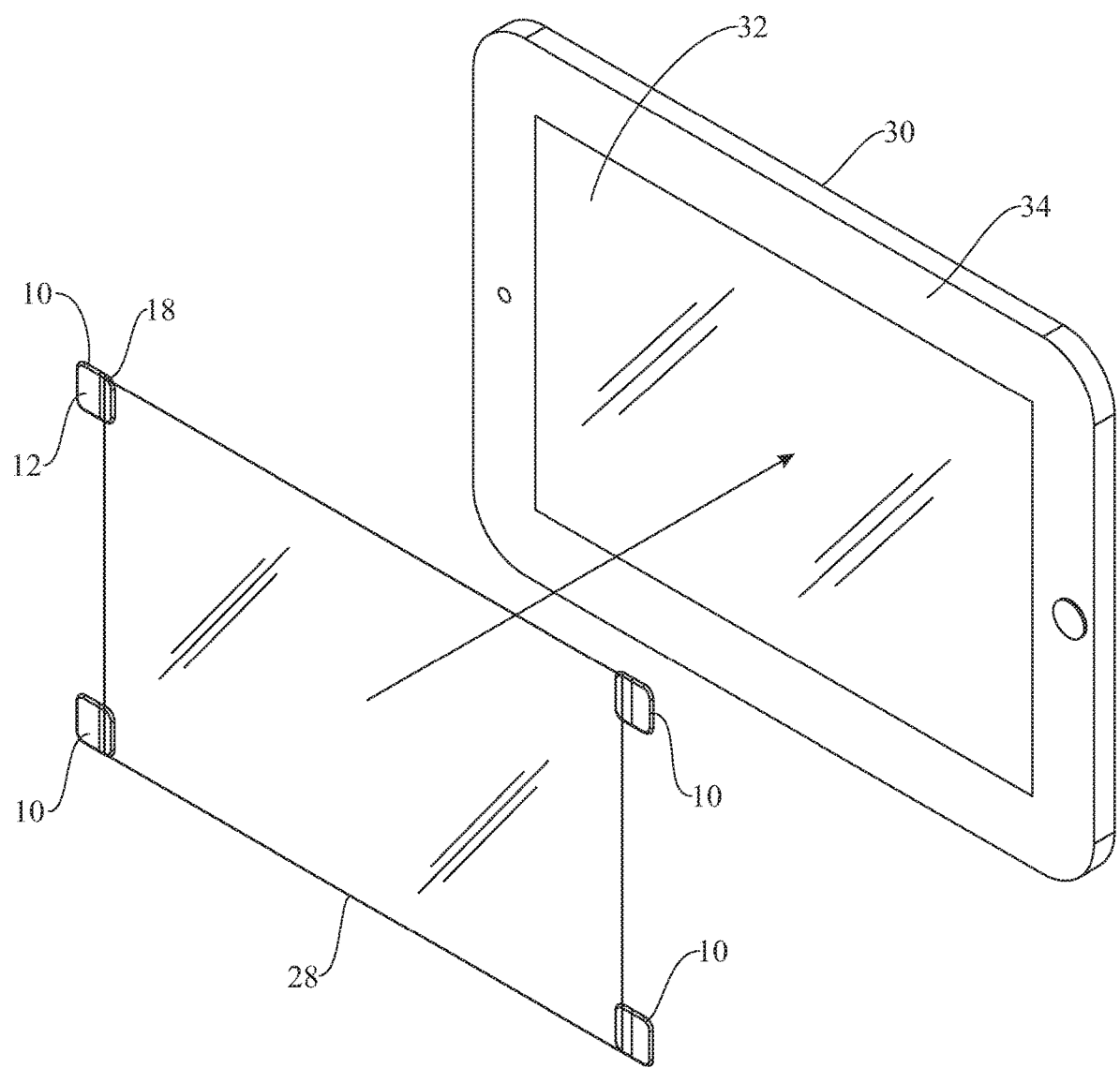
FIG. 4 is a perspective view of the screen protector of FIG. 3, shown readily attachable to the peripheral edge of a display screen of an electronic device, via screen protector attachment devices, in accordance with an embodiment of the present invention.
Figure 5:
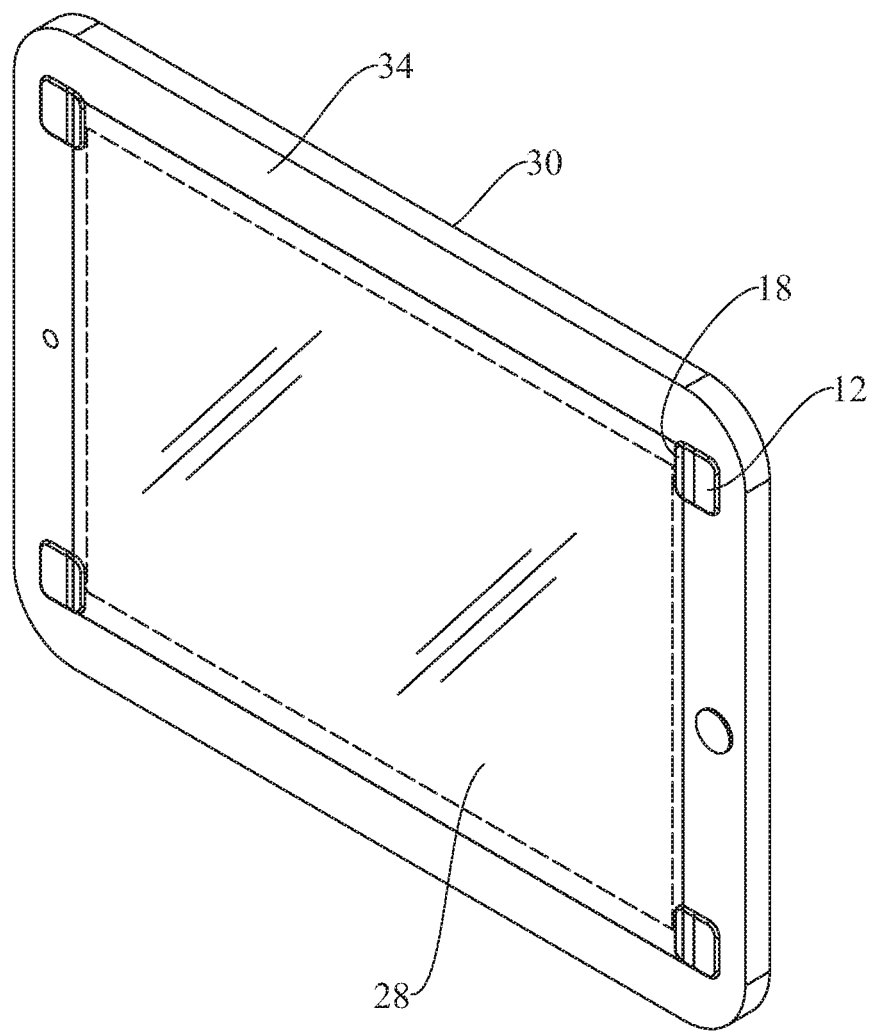
FIG. 5 is a perspective view of the screen protector of FIG. 4, shown releasably attached to the peripheral edge of the electronic device by screen protector attachment devices of FIG. 1, in accordance with an embodiment of the present invention.

With reference made to FIGS. 4 and 5, there are shown perspective views of the screen protector 28 of FIG. 3, in which a plurality of screen protector attachment devices 10 are attached along the longitudinal corner edges of the screen protector 28 for readily attaching the protector 28 in an overlying relation to a viewing display 32 of an electronic device 30, in accordance with at least one embodiment of the present invention. A plurality of screen protector attachment devices 10 are attached to each corner edge of the screen protector 28 for readily attaching the screen protector 28 to the electronic device 30 via the plurality of screen protector attachment devices 10 attached thereto, as denoted by the arrow in FIG. 4. To secure the screen protector 28 in place, each base bracket 12 is securely affixed to a frame or peripheral edge 34 of an electronic device 30 by using well-known attachment mechanisms including, but not limited to, adhesives, double sided tape, hook and loop fasteners, or other such secure attachment mechanism so that each bracket 12 is securely attached to the frame 34 thereby holding the screen protector 28 in place, as shown in FIG. 5. Adjustments can easily be made to correctly align and position the screen protector 28 over the viewing display 32 of the electronic device 30 by simply moving one or more of the base brackets 12. Conveniently, the magnetic attraction of the base bracket 12 to the screen foil bracket 18 allows users to move one or more base brackets 12, or one or more foil brackets 18 in a vertical or horizontal direction to correspondingly align and positon a screen protector 28 in an overlying relation to a viewing display 32 of an electronic device 30.

An advantage of the screen protector attachment device 10 is that it is tailored for use with a variety of different screen protectors 28 or electronic device 30, and is not restricted for use with any particular screen protector 28 or electronic device 30. The screen protector attachment device 10 further provides the added benefit of attaching screen protectors 28 to electronic devices 30 that have full visual screens in which the viewing display 32 goes up to the edge of the electronic device 30, thus eliminating the peripheral edge or frame 34, as shown in FIG. 5. As such, various embodiments of the screen protector attachment devices 10 are provided to address the needs for attaching screen protectors 28 to portable or non-portable electronic devices 30 having a full viewing display 32.

Figure 6:
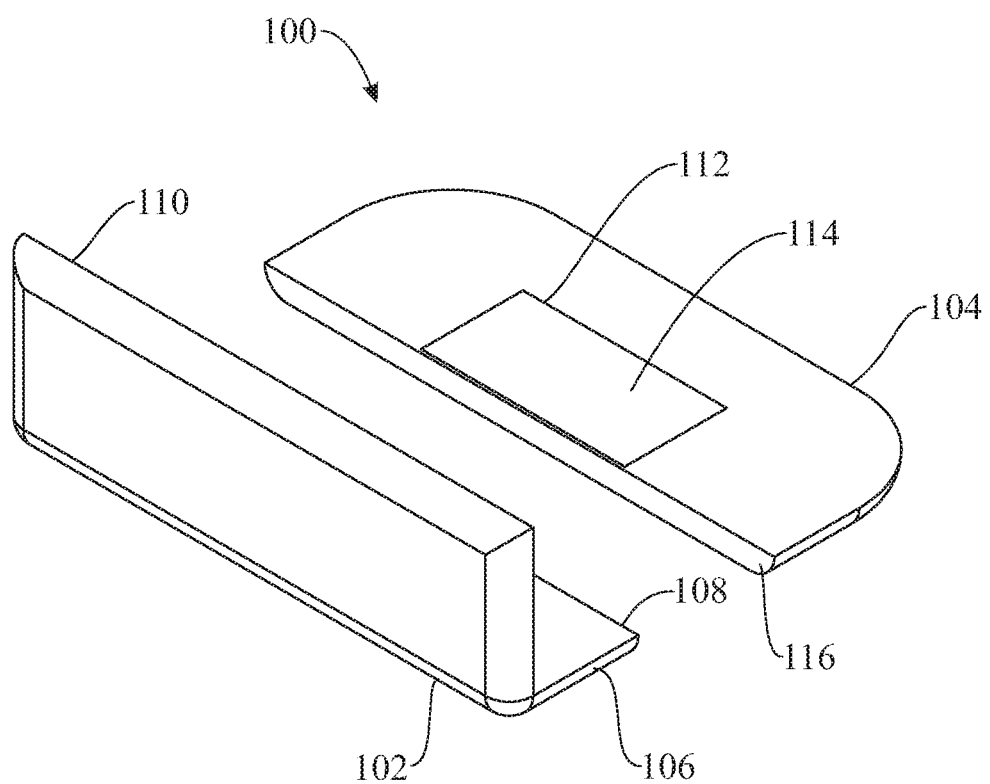
FIG. 6 is an isometric view of a screen protector attachment device, showing an angled base bracket and a screen foil bracket, in accordance with another embodiment of the present invention.

Turning now to FIG. 6, there is shown an exploded perspective view of a screen protector attachment device 100 for mounting a screen protector 28 to an electronic device 30 having a full viewing display 32, or a framed viewing display 32 like on desktop monitors, in accordance with an alternative embodiment of the present invention. Screen protector attachment device 100 comprises an angled bracket 102 that is releasably attachable to a screen foil bracket 104. Angled bracket 102 includes a bottom member 106 having a planar surface, a lateral edge 108, and a recess (not shown) that is formed within the bottom member 106 for retaining a magnet therein. A side member 110 is attached perpendicular along one edge of the bottom member 106, opposite the lateral edge 108. As shown, side member 110 may include beveled configurations. The screen foil bracket 104 includes a foil recess 112 for retaining a foil magnet 114 therein. A recess, such as recess 112, is formed within the body of each respective bracket 104, 106 and positioned in a generally central region along one side of the bracket, such that a sidewall of each recess provides a lateral or peripheral edge 108, 116.

In use, a plurality of screen foil brackets 104 are situated about the longitudinal corner edges of a screen protector 28, as is shown by way of example in FIG. 3, where a portion of the screen protector 28 is securely attached to each screen foil bracket 104, as before, using well-known adhesives or fasteners. Each angled bracket 102 is placed along an edge of a viewing display 32 of an electronic device 30 so that the bottom member 106 rests on the upper side of the viewing display 32 using double-sided tape or other fasteners, while side member 110 extends away from the viewing display 32. The screen protector 28 is positioned over the viewing display 32 of the electronic device 30 with the screen foil bracket 104 attached to the bottom member 106 of the angled bracket 102 by the magnetic attraction of magnets 114. Unlike many prior art devices, the angled bracket 102 is adapted such that it does not interfere with closing mechanisms of a tablet or notebook computer while installed thereon.

When attaching screen protectors 100 comprising angled brackets 102 to electronic devices 30 having full viewing displays 32, the angled bracket 102 is fixed around a corner of the full viewing display 32 of an electronic device 30 such that the side member 110 extends away from and opposite the front of the full viewing display 32, and the bottom member 106 rests on the side of the viewing display 32. The screen protector 28 is positioned over the viewing display 32 of the electronic device 30 with the screen foil bracket 104 disposed in an approximately 90-degree angle relative to the bottom member 106 of the angled bracket 102 by the magnetic attraction of magnets 114.

Also, when attaching screen protectors 100 comprising angled brackets 102 for electronic devices 30 having a framed screen, such as, for example, desktop monitors, the angled bracket 102 is placed around the frame of the viewing display 32 of the electronic device 30 so that the side member 110 faces along the top surface of the frame, and the bottom member 106 extends away and opposite from the viewing display 32. The screen protector 28 is positioned over the viewing display 32 of the electronic device 30 with the screen foil bracket 104 disposed in an approximately 90-degree angle to the bottom member 106 of the angled bracket 102 by the magnetic attraction of magnets 114.

Figure 7:
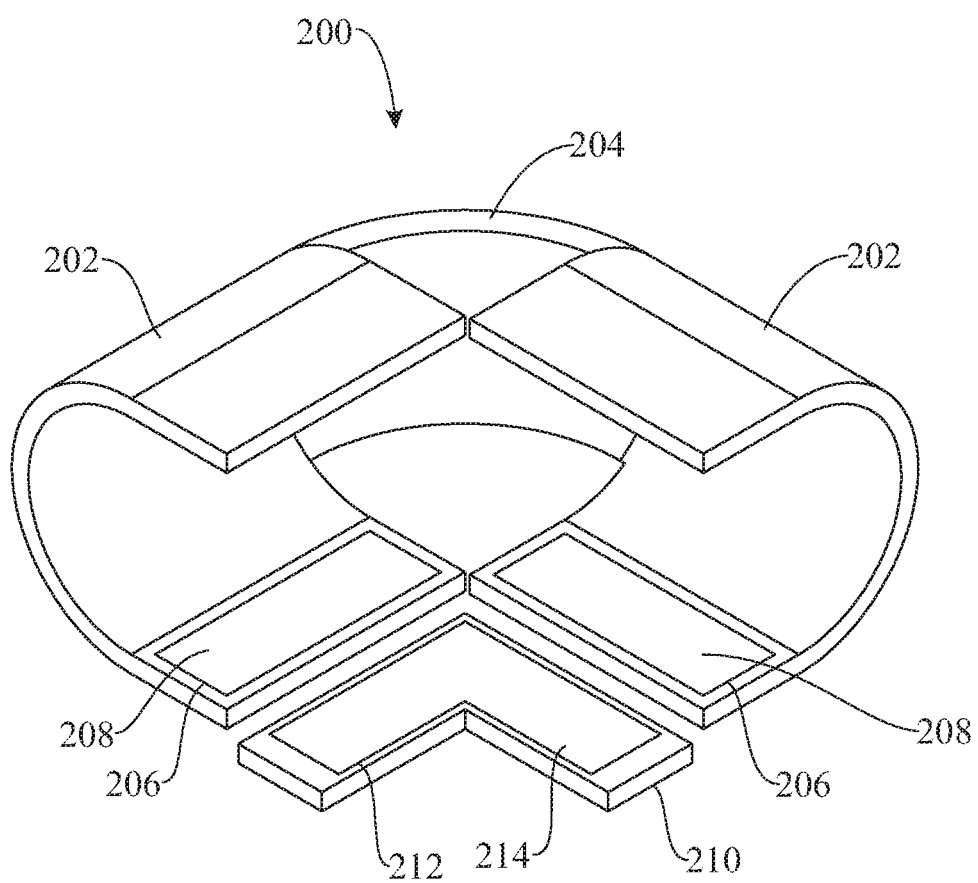
FIG. 7 is an isomeric view of a screen protector attachment device, showing a corner bracket and a screen foil bracket, in accordance with an alternative embodiment of the present invention.

Referring to FIG. 7, there is shown a front perspective view of a screen protector attachment device 200, showing a corner bracket, and a screen foil bracket, in accordance with an alternative embodiment of the present invention. The screen protector attachment device 200 is adapted for placement on the corners of an electronic device 30 while retaining a screen protector 28 in place on a viewing display 32 of the device. Screen protector attachment device 200 includes a pair of curved brackets 202 that are coupled together by a bridge connector 204. Each curved bracket 202 includes a recess 206 for retaining a magnet 208 therein. As shown, each recess 206 is formed within the body of the curved bracket 202, and one side of each recess 206 at least partially defines a leading edge of each bracket 202. Device 200 includes a screen foil bracket 210 comprising a generally L-shape configuration including a recess 212 for receiving a magnet 214 therein. The L-shape configuration of the screen foil bracket 210 provides outer edges that are adapted to abut against the outer leading edges of each bracket 202. More in particular, when operatively disposed on a viewing display 32 of an electronic device 30, brackets 202, 210 abut together against one another as a result of the magnetic force of magnets 208 and 214, respectively. As before, the brackets 202, 210 of the screen protector attachment device 200 may comprise any of a number of materials of construction including, but not limited to, a pliable soft rubber or hard foam.

In use, a plurality of screen foil brackets 210, generally four, are securely attached about the corner edges of a screen protector 28. A screen protector attachment device 200 is releasably secured on the four corners of the electronic device 30, thereby disposing the screen protector 28 over the viewing display 32 of the electronic device 30. Each screen foil bracket 210 attaches to each corresponding pair of curved brackets 202, once again, via the magnetic force of magnets 208 and 214, respectively, resulting in the outer leading edges of each bracket 202 to abut along and against the outer edges of the screen foil bracket 210. An added benefit of the screen protector attachment device 200 is that it also protects the four corners of the electronic device 30 during use. The padded feature of the device 200 helps absorb impact should the electronic device 30 fall to the floor or ground, much as a protective case.

Figure 8:
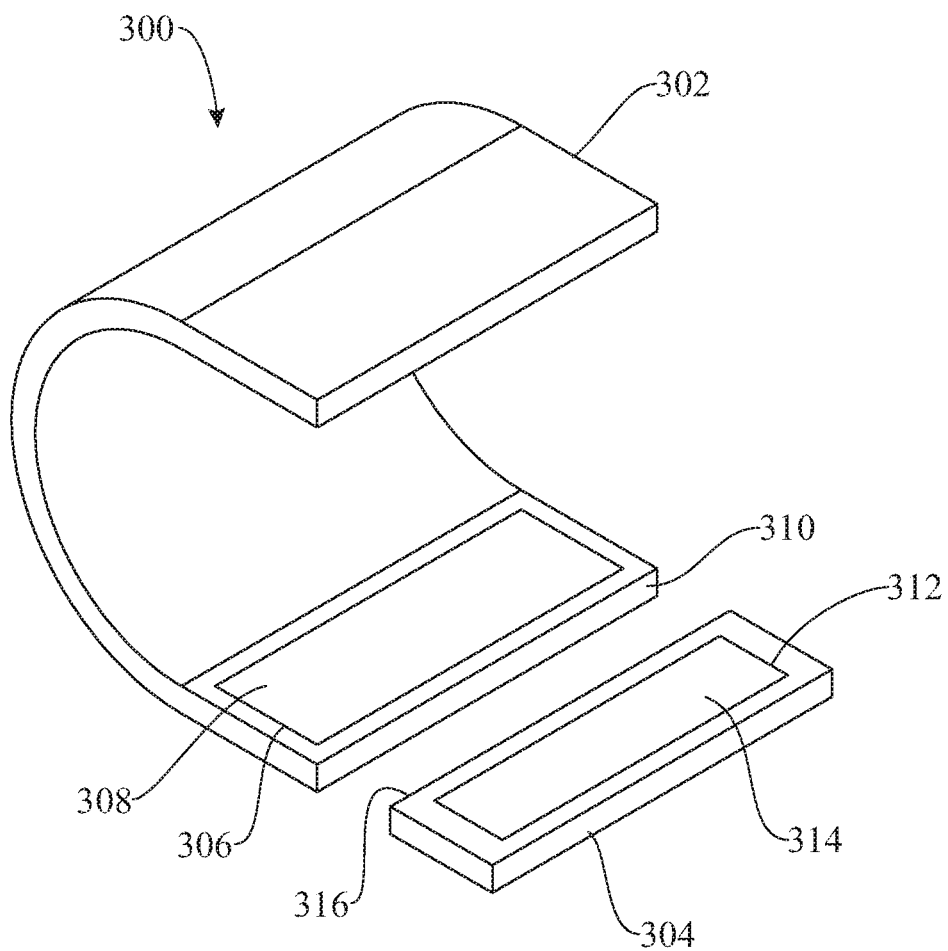
FIG. 8 is an isometric view of a screen protector attachment device, showing a curved bracket and a screen foil bracket, in accordance with another embodiment of the present invention.

Turning now to FIG. 8 there is shown a side perspective view of a screen protector attachment device 300, showing a curved bracket 302, and a screen foil bracket 304, in accordance with another embodiment of the present invention. The screen protector attachment device 300 is employed with electronic devices 30 that provide either a full viewing display, or devices that include a peripheral frame or edge as denoted at 34 in FIG. 4. The curved bracket 302 includes a curved body having a recess 306 that is formed at a leading end within the body of the curved bracket 302. A magnet 308 is secured within the recess 306 where one side of the recess 306 at least partially defines a lateral edge 310 of the curved bracket 302. Device 300 further includes a screen foil bracket 304 having a recess 312 that is also dimensioned to retain a magnet, such as magnet 314, where the recess 312 also at least partially defines a lateral edge 316.

In use, a plurality of screen foil brackets 304 are securely attached about the edges of a screen protector 28. Curved brackets 302 are positioned around the edge of the viewing display 32 of the electronic device 30, and the screen protector 28 is disposed over the viewing display 32 of the electronic device 30 allowing for each screen foil bracket 304 to engage each curved bracket 302, via the magnets 308 and 314. In doing so, the edges 310 of each curved bracket 302 engages the edges 316 of each screen foil bracket 304. The dimensional aspects of each screen foil bracket 304 is configured to provide an unobstructed view of the display screen of the electronic device 30 when the screen protector 300 is installed on the viewing display 32 of the electronic device 30.

Figure 9:
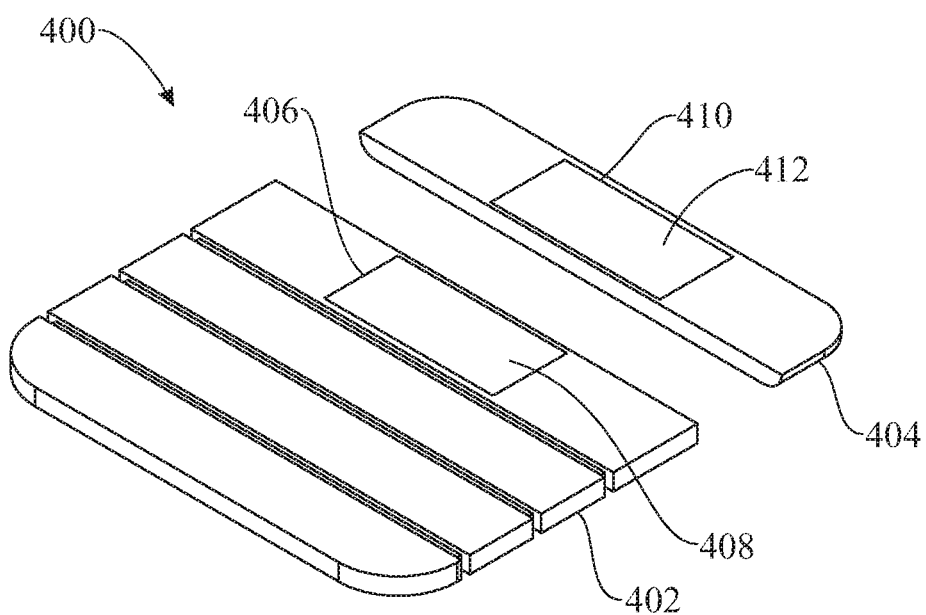
FIG. 9 is a top isometric view of a screen protector attachment device, showing a flexible bracket and a screen foil bracket, in accordance with another embodiment of the present invention.
Figure 10:
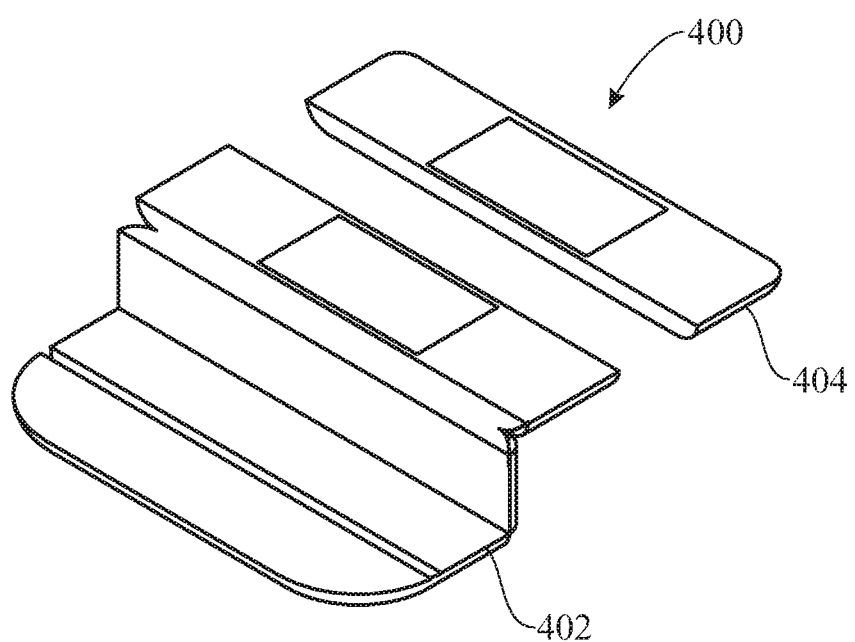
FIG. 10 is a top isometric view of the screen protector attachment device of FIG. 9, showing an operative bend in the flexible bracket and the screen foil bracket, in accordance with one embodiment of the present invention.

In accordance with another embodiment of the screen protector attachment device 400, there is shown in FIGS. 9 and 10, a top perspective view of a screen protector attachment device 400, showing a flexible base bracket 402, and a screen foil bracket 404. The flexible bracket 402 includes a series of fold lines or moveable hinges formed within the body of the bracket 402 defining a series of panels, each adapted to be movable along the movable hinges, as best illustrated in FIG. 10. A recess 406 is formed within the body of a forward panel to retain a magnet 408 therein. Screen protector attachment device 400 also includes a screen foil bracket 404 including a recess 410 formed therein for retaining a magnet 412 therein. The flexible bracket 402 is adapted for use on a wide variety of full viewing displays 32 but can also be used with electronic devices 30 that have frames. The flexibility of the bracket 402 allows use of the present screen protector attachment device 400 with electronic devices 30 that vary in depth as well. Thus, the flexible bracket 402 can be manipulated in various ways to accommodate electronic devices 30 of different sizes having frames or full viewing displays 32. In one exemplary application, two panels of the bracket 402 are attached to the top surface of a frame of an electronic device 30 using adhesives, such as double face tape, or other fasteners, and two other panels are folded along a fold line to abut against the inner, vertical edge of the frame of the electronic device 30 in ready position for detachably receiving the screen foil bracket 404, via magnetic force between magnets 408 and 412 when the screen protector is situated in place over the viewing display 32 of the electronic device 30.

It will be understood that the present invention may be constructed or fabricated using a variety of processes or techniques, such as 3-D printing, injection molding, or assembly. Each screen protector attachment device 10, 100, 200, 300, 400 may come in a variety of different colors, include any artistic features, characters, or logos, and include friction elements or materials such as ridges, protrusions, rubber, indentations, to enhance retention of brackets when attached to an electronic device 30. Further, each screen foil bracket 18, 104, 210, 304, and 404 is dimensionally configured to provide unobstructed viewing of the viewing display 32 of the electronic device 30 when a screen protector 28 is installed or mounted onto the viewing display 32 of an electronic device 30.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A screen protector attachment device for removably attaching a screen protector to a viewing display of an electronic device, said screen protector attachment device comprising:
   at least one base bracket securely attached to a portion of the electronic device, said base bracket comprising at least one base recess;
   said base recess disposed adjacent a base peripheral edge;
   a base magnet disposed in said base recess;
   at least one screen foil bracket securely attached to a portion of the screen protector, said screen foil bracket comprising at least one foil recess;

said foil recess disposed adjacent a foil peripheral edge;
a foil magnet disposed in said foil recess; and
said base bracket and said screen foil bracket detachably couple together along at least portions of said base peripheral edge and said foil peripheral edge, respectively, by magnetic forces between said base magnet and said foil magnet, thereby removably attaching the screen protector to at least a portion of the viewing display of the electronic device.

2. The screen protector attachment device as recited in claim 1 wherein said base bracket comprises a planar configuration.

3. The screen protector attachment device as recited in claim 2 wherein said planar configuration of said base bracket is at least partially defined by a planar top base surface and a planar bottom base surface.

4. The screen protector attachment device as recited in claim 3 wherein said base magnet is disposed in said base recess such that a top surface of said base magnet is coplanar with said planar top base surface of said base bracket.

5. The screen protector attachment device as recited in claim 3 wherein said base magnet is disposed in said base recess such that said base magnet is at least partially encased in said base bracket.

6. The screen protector attachment device as recited in claim 3 wherein said base magnet is disposed in said base recess such that said base magnet is completely encased in said base bracket.

7. The screen protector attachment device as recited in claim 1 wherein said screen foil bracket comprises a planar configuration.

8. The screen protector attachment device as recited in claim 7 wherein said planar configuration of said screen foil bracket is at least partially defined by a planar top foil surface and a planar bottom foil surface.

9. The screen protector attachment device as recited in claim 8 wherein said foil magnet is disposed in said foil recess such that a top surface of said foil magnet is coplanar with said planar top foil surface of said screen foil bracket.

10. The screen protector attachment device as recited in claim 8 wherein said foil magnet is disposed in said foil recess such that said foil magnet is at least partially encased in said screen foil bracket.

11. The screen protector attachment device as recited in claim 8 said foil magnet is disposed in said foil recess such that said foil magnet is completely encased in said screen foil bracket.

12. The screen protector attachment device as recited in claim 1 wherein a width of said screen foil bracket is less than a width of said base bracket to minimize obstruction of the viewing display of the electronic device.

13. The screen protector attachment device as recited in claim 1 wherein said at least one base bracket comprises an angled base bracket having a planar member comprising a base recess disposed adjacent a base peripheral edge, said base recess dimensioned to receive a base magnet therein, and a side member attached to said planar member and disposed perpendicular therewith.

14. The screen protector attachment device as recited in claim 13 wherein said angled base bracket and said screen foil bracket detachably couple together along at least portions of said base peripheral edge and said foil peripheral edge, respectively, by magnetic forces between said base magnet and said foil magnet, thereby removably attaching the screen protector to at least a portion of the viewing display of the electronic device.

15. The screen protector attachment device as recited in claim 1 wherein said at least one base bracket comprises a curved base bracket having a curved body including a base recess formed at one end of said curved body dimensioned to receive a base magnet therein.

16. The screen protector attachment device as recited in claim 15 further comprising a plurality of curved base brackets each having a curved body including a base recess formed at a corresponding end of each said curved body for receiving a different one of a plurality of base magnets therein, wherein said curved base brackets are interconnected via a bridge to form a generally 90 degree angle therewith.

17. The screen protector attachment device as recited in claim 1 wherein said at least one base bracket comprises a flexible base bracket having a plurality of panels, each of said plurality of panels attached to one or more adjacent ones of said plurality of panels via a moveable hinge, such that each of said plurality of panels is movable relative to adjacent ones of said plurality of panels, and at least one of said plurality of panels includes a panel recess for receiving a base magnet therein.

18. A screen protector attachment device for removably attaching a screen protector to a viewing display of an electronic device, said screen protector attachment device comprising:
a plurality of base brackets each securely attached to a different portion of the electronic device, each of said plurality of base brackets comprising at least one base recess;
each said base recess disposed adjacent a base peripheral edge of a corresponding one of said plurality of base brackets;
a base magnet disposed in each said base recess;
a plurality of screen foil brackets each securely attached to a different portion of the screen protector, each of said plurality of screen foil brackets comprising at least one foil recess;
each said foil recess disposed adjacent a foil peripheral edge of a corresponding one of said plurality of screen foil brackets;
a foil magnet disposed in each said foil recess; and
each of said plurality of said base brackets and a corresponding one of said plurality of said screen foil brackets detachably couple together along at least portions of corresponding one of said base peripheral edges and said foil peripheral edges, respectively, by magnetic forces between corresponding ones of said base magnets and said foil magnets, thereby removably attaching the screen protector in an overlying relation to at least a portion of the viewing display of the electronic device.

19. The screen protector attachment device as recited in claim 18 wherein a width of each of said plurality of screen foil brackets is less than a width of a corresponding one of said plurality of base brackets to minimize obstruction of the viewing display of the electronic device.

20. A screen protector attachment device for removably attaching a screen protector to a viewing display of an electronic device, said screen protector attachment device comprising:
a plurality of base brackets each securely attached to a different portion of the electronic device, each of said plurality of base brackets comprises a planar configuration having at least one base recess therein, said planar configuration at least partially defined by a planar top base surface and a planar bottom base surface;

a base magnet disposed in said base recess of each of said plurality of base brackets;

each said base recess disposed adjacent a base peripheral edge of a corresponding one of said plurality of base brackets, wherein each said base magnet is disposed in said base recess of a corresponding one of said plurality of base brackets such that a top surface of said base magnet is coplanar with said planar top base surface of said corresponding one of said plurality of base brackets;

a plurality of screen foil brackets each securely attached to a different portion of said screen protector, each of said plurality of screen foil brackets comprising a planar configuration having at least one foil recess therein, said planar configuration at least partially defined by a planar top foil surface and a planar bottom foil surface;

a foil magnet disposed within said foil recess of each of said plurality of foil screen brackets;

each said foil recess disposed adjacent a foil peripheral edge of a corresponding one of said plurality of screen foil brackets, wherein each said foil magnet is disposed in said foil recess of a corresponding one of said plurality of screen foil brackets such that a top surface of said foil magnet is coplanar with said planar top base surface of said corresponding one of said plurality of screen foil brackets; and each of said plurality of base brackets and a corresponding one of said plurality of screen foil brackets detachably couple together along at least portions of corresponding ones of said base peripheral edges and said foil peripheral edges, respectively, by magnetic forces between corresponding ones of said base magnets and said foil magnets, thereby removably attaching said screen protector in an overlying relation to at least a portion of the viewing display of the electronic device.

* * * * *